US007124628B2

(12) United States Patent
Wildman

(10) Patent No.: US 7,124,628 B2
(45) Date of Patent: Oct. 24, 2006

(54) INJECTION PRESSURE REGULATOR TEST SYSTEM

(75) Inventor: Mark A. Wildman, Plainfield, IN (US)

(73) Assignee: International Engine Intellectual Property Company LLC, Warrenville, IL (US)

(*) Notice: Subject to any disclaimer, the term of this patent is extended or adjusted under 35 U.S.C. 154(b) by 0 days.

(21) Appl. No.: 10/812,671

(22) Filed: Mar. 30, 2004

(65) Prior Publication Data

US 2005/0217358 A1 Oct. 6, 2005

(51) Int. Cl.
*G01M 15/00* (2006.01)

(52) U.S. Cl. .................................................... 73/119 A

(58) Field of Classification Search .................. 73/116, 73/117.2, 117.3, 118.1, 119 A, 119 R, 46, 73/47, 49.7, 117.1
See application file for complete search history.

(56) References Cited

U.S. PATENT DOCUMENTS

| | | | | |
|---|---|---|---|---|
| 4,986,472 | A * | 1/1991 | Warlick et al. | 239/88 |
| 6,460,510 | B1 * | 10/2002 | Breeden | 123/446 |
| 6,484,573 | B1 * | 11/2002 | Bundock et al. | 73/119 A |
| 6,532,809 | B1 * | 3/2003 | Robinson | 73/119 A |
| 6,662,784 | B1 * | 12/2003 | Breeden | 123/446 |
| 2001/0032620 | A1 * | 10/2001 | Bundock et al. | 123/457 |
| 2002/0007662 | A1 * | 1/2002 | Robinson | 73/37 |

* cited by examiner

*Primary Examiner*—Eric S. McCall

(57) ABSTRACT

An injection pressure regulator testing system has a sleeve, a pressure source, and a power supply. The injection pressure regulator is inserted into a test chamber formed by the sleeve. The power source activates the injection pressure regulator for operation at a selected pressure level. The pressure source pumps hydraulic fluid into the test chamber. A determination is made as to whether the injection pressure regulator can achieve a selected pressure level.

7 Claims, 4 Drawing Sheets

INJECTION PRESSURE REGULATOR TEST SYSTEM

FIELD OF THE INVENTION

This invention generally relates to testing devices for pressure regulators used in internal combustion engines. More particularly, this invention relates to testing devices for testing pressure regulators used in high pressure hydraulic systems in diesel engines.

BACKGROUND OF THE INVENTION

Internal combustion engines convert chemical energy from a fuel into mechanical energy. The fuel may be petroleum-based, natural gas, another combustible material, or a combination thereof. Most internal combustion engines inject an air-fuel mixture into one or more cylinders. The fuel ignites to generate rapidly expanding gases that actuate a piston in the cylinder. The fuel may be ignited by compression such as in a diesel engine or through some type of spark such as the spark plug in a gasoline engine. The piston usually is connected to a crankshaft or similar device for converting the reciprocating motion of the piston into rotational motion. The rotational motion from the crankshaft may be used to propel a vehicle, operate a pump or an electrical generator, or perform other work. A vehicle may be a truck, an automobile, a boat, or the like.

Many internal combustion engines use a fuel injection system to deliver fuel to the cylinders. A fuel injector usually sprays a measured amount of fuel in the cylinder. In diesel engines, the fuel pressure typically is increased for injecting the fuel near or at the end of the compression cycle. Fuel injectors for diesel engines usually have an actuating mechanism such as a piston to increase the pressure of the fuel. The actuating mechanism in many fuel injectors is hydraulically activated. Some diesel engines use hydraulically activated electronically controlled unit injection (HEUI) fuel injectors.

HEUI fuel injectors usually require high-pressure hydraulic fluid or oil for proper operation. The oil pressure varies in the range of about in the range of about 500 psi (3 MPa) through about 4,500 psi (31 MPa) depending upon the operating mode and condition of the engine. In a typical HEUI fuel injection system, a low-pressure pump moves oil from an oil reservoir to a high-pressure pump. The high-pressure pump provides high pressure oil to an oil rail or manifold, which supplies the high pressure oil to the fuel injectors in the engine.

Many HEUI fuel injection systems use an injection pressure regulator (IPR) to control the output pressure of the high-pressure pump. The pressure control includes the amount, timing, and changes of pressure in response to the engine mode and operating conditions. An IPR is an electrically-controlled pressure release valve that typically is placed on the outlet side of the high-pressure oil pump. The IPR usually has a solenoid, a poppet valve, and a spool valve. When energized, the solenoid operates the poppet valve to control the amount of oil entering a spool chamber in the spool valve. The pressure of the oil in the spool chamber moves a spool to open and close drain ports in the spool valve. The drain ports are connected to a return circuit to the oil reservoir for the engine. The solenoid controls the spool valve in response to control signals from a vehicle's on-board computer or other electronics. When the oil pressure is too high, the IPR opens the drain ports in the spool valve to let oil pass through the drain port and into the return circuit. When the oil pressure is too-low or there is a high-pressure demand from the engine, the IPR closes the drain ports to block the exit of oil through the drain ports. The drain ports may be closed, partially open, or fully open at different times to maintain the desired oil pressures during operation of the engine.

An internal pressure regulator (IPR) may be replaced when operating improperly. An IPR may be replaced during engine repairs or maintenance even when working properly. If there are difficulties starting the engine or concerns with the high-pressure pump, many service technicians replace the IPR as part of a general diagnostic approach to address these difficulties and concerns. If the new IPR does not address the difficulties or concerns, the old IPR is not reinstalled even though it may work properly. The old IPR may not be tested to determine whether it works properly. The replacement of an IPR that works properly may increase the operating and/or maintenance costs of the engine.

SUMMARY

This invention provides a test system for testing an injection pressure regulator. The injection pressure regulator is inserted into a sleeve. Hydraulic fluid is pumped into the sleeve. A determination is made as to whether the injection pressure regulator can achieve a selected pressure level.

An injection pressure regulator testing system may have a sleeve, a pressure source, a drain, and a power supply. The sleeve forms a test chamber with an inside surface. The sleeve has a first interface and a second interface on the inside surface. The sleeve forms an inlet passage to the test chamber. The sleeve forms a drain passage to the test chamber. The drain passage is between the first and second interfaces. The pressure source is connected to the inlet passage via an inlet tube. The drain is connected to the drain passage via a drain tube. The power supply has a wire that connects to an injection pressure regulator when the injection pressure regulator is inserted into the test chamber.

In a method for testing an injection pressure regulator, an injection pressure regulator is sealed in a test chamber formed by a sleeve. The injection pressure regulator is activated for operation at a selected pressure level. Hydraulic fluid is pumped into the test chamber. A determination is made whether the injection pressure regulator can achieve the selected pressure level.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
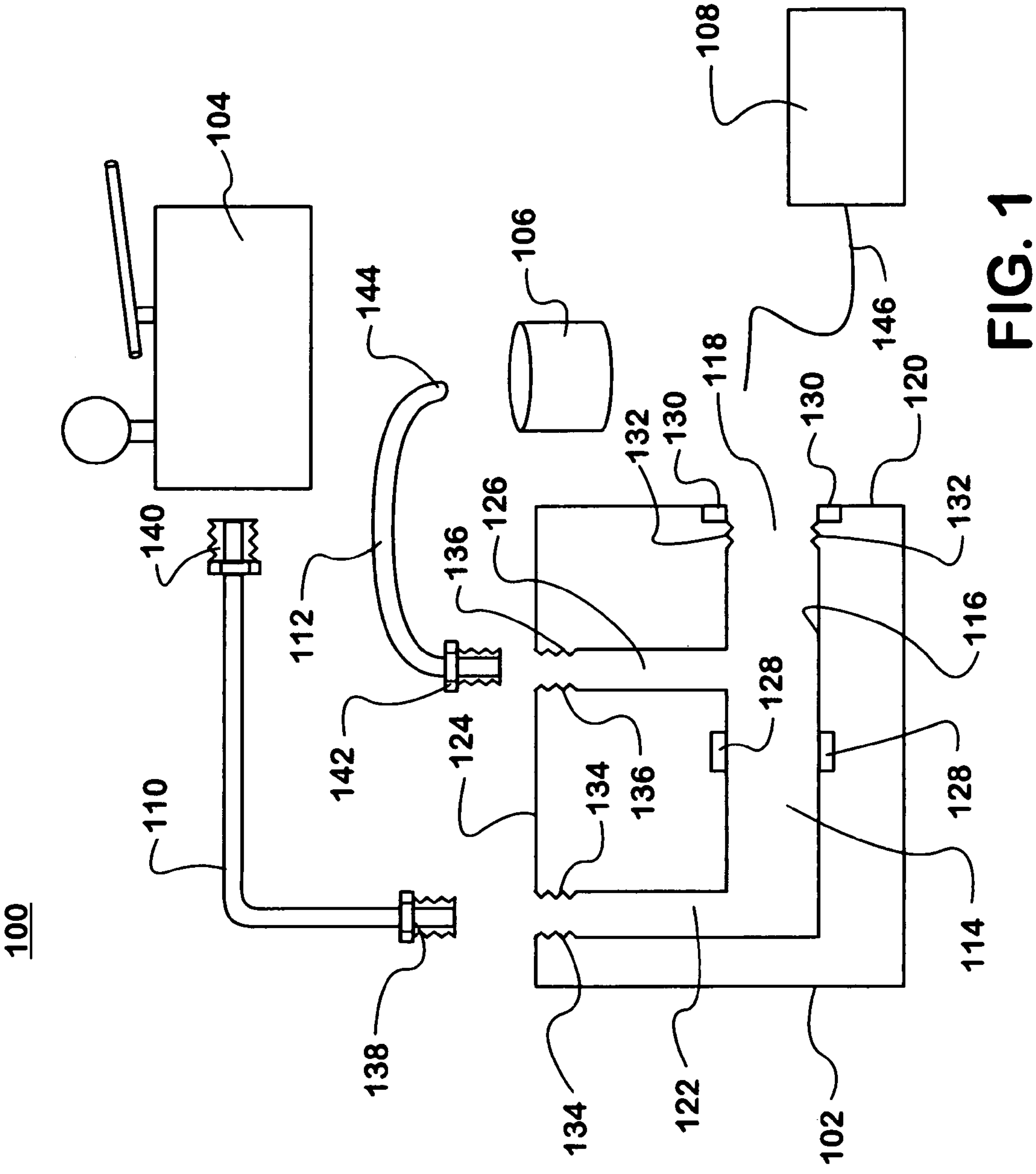
FIG. 1 is a schematic view of an unassembled injection pressure regulator test system.
Figure 2:
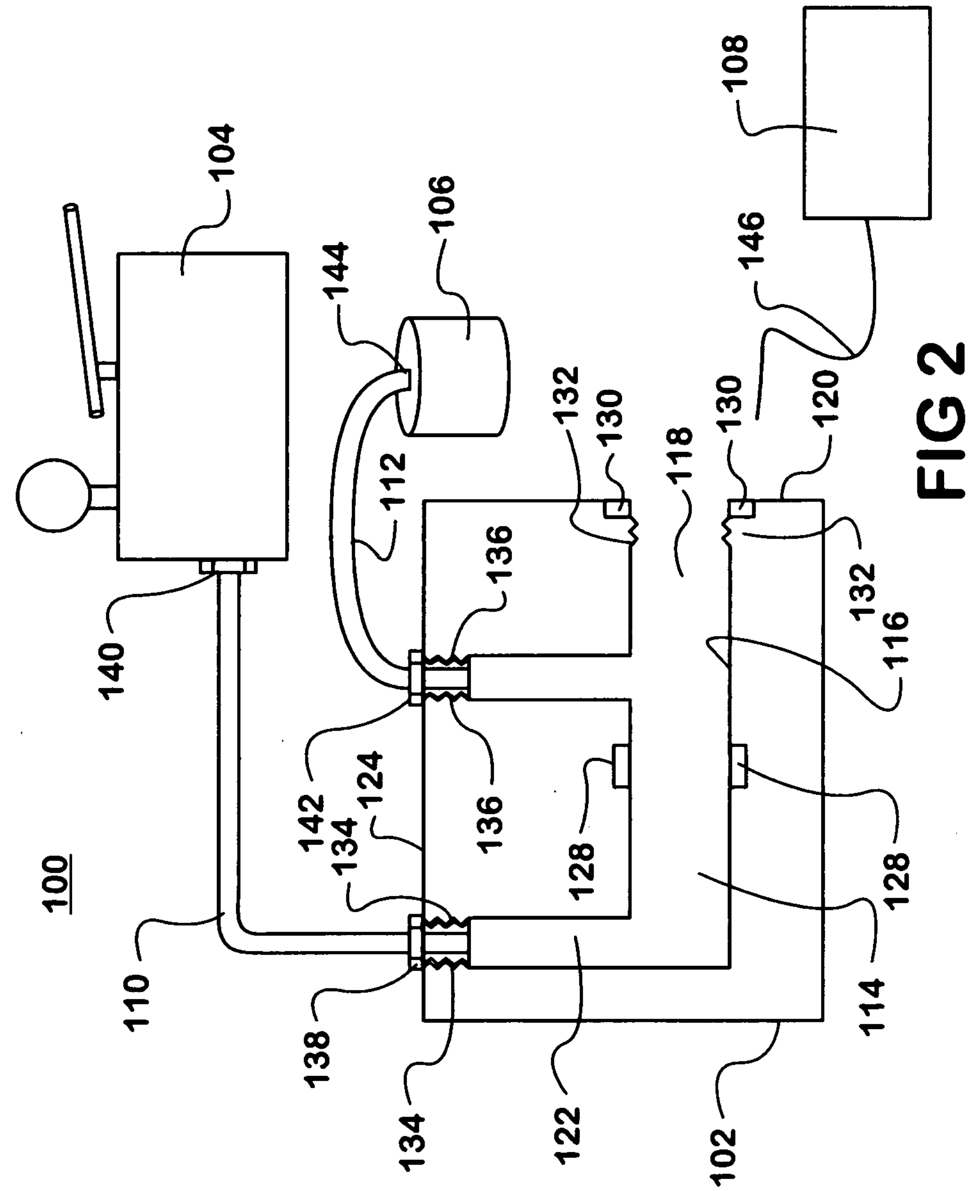
FIG. 2 is a schematic view of an assembled injection pressure regulator test system.

FIGS. 1–2 show views of an injection pressure regulator (IPR) test system 100. The IPR test system 100 may be used to test pressure regulators used on high pressure hydraulic systems such as a hydraulically activated electronically controlled unit injection (HEUI) fuel injection system. The IPR test system 100 may be used to test other types of pressure regulators including those using a spool valve. The IPR test system 100 has a sleeve 102, a pressure source 104, a drain 106, and a power supply 108. The sleeve 102 is connected to the pressure source 104 by an input tube 110. The sleeve 102 is connected to the drain 106 by a drain tube 112. During testing, an injection pressure regulator is inserted into the sleeve 102. The power supply 108 is connected and activates the injection pressure regulator. The pressure source 104 pumps hydraulic fluid into the sleeve 102 and attempts to increase the pressure to a selected pressure level. If the injection pressure regulator cannot achieve the selected pressure level, the injection pressure regulator is deemed not to work properly. If the injection pressure regulator can achieve the selected pressure level, the injection pressure regulator is deemed to work properly. While a particular configuration is shown, the IPR test system 100 may have other configurations including those with additional components.

The sleeve 102 is configured to receive an injection pressure regulator so that the O-ring seals on the injection pressure regulator fit into the sleeve 102 as when the injection pressure regulator is installed in a high-pressure oil pump. The test chamber 114 may be configured to receive one size or type of injection pressure regulator. The test chamber 114 may be configured to receive multiple sizes or types of injection pressure regulators. The sleeve 102 may be made of aluminum, an aluminum alloy, or like material.

The sleeve 102 forms a test chamber 114 with an inside surface 116. The test chamber 114 forms an opening 118 into the test chamber 114 from a front end 120. The sleeve 102 forms an inlet passage 122 from a top side 124 into the test chamber 114 at an end opposite the opening 118. The sleeve 102 forms a drain passage 126 from the top side 124 into the test chamber 114 at a position between the inlet passage 122 and the opening 118. The inlet passage 122 and the drain passage 126 may be formed on other or different sides of the sleeve 102.

The sleeve 102 has a middle interface 128 along a circumference of the inside surface 116 between the inlet passage 122 and the drain passage 126. The middle interface 128 defines a contact surface where the inside surface 116 sealably engages an inlet O-ring of the injection pressure regulator when the injection pressure regulator is inserted into the test chamber 114. Sealably engages includes the formation of a seal where essentially little or no hydraulic fluid can pass. Sealably engages includes the formation of a seal where any hydraulic fluid that may pass does not substantially affect the pressure of the hydraulic fluid in the test chamber 114.

The sleeve 102 has an end interface 130 along a circumference of the inside surface 116 at the front end 120 of the test chamber 114. The end interface 130 defines a contact surface where the inside surface 116 and/or the front end 120 sealably engages a base O-ring of the injection pressure regulator when the injection pressure regulator is inserted into the test chamber 114. The contact surfaces may have a pattern or other surface treatment to improve the seal with the O-rings.

The sleeve 102 forms a first threaded portion 132 along a circumference of the inside surface 116 at the front end 120 of the test chamber 114. The first threaded portion 132 may be adjacent to or incorporated with the end interface 130. The first threaded portion 132 may be configured to interlock with a threaded portion on an injection pressure regulator when the injection pressure regulator is screwed into the test chamber 114. The first threaded portion 132 may have one more threads of similar size and pitch as a threaded portion on the injection pressure regulator. The sleeve 102 may have another connection mechanism such as a clamp or bracket device to hold the injection pressure regulator in the test chamber 114.

The sleeve 102 forms a second threaded portion 134 along a circumference of the inlet passage 122 at the top side 124. The sleeve 102 forms a third threaded portion 136 along a circumference of the drain passage 126 at the top side 124.

The pressure source 104 has a pump for providing and increasing the pressure of hydraulic fluid in the test chamber 114. The hydraulic fluid may be calibrating oil or the like. The pump may be hand-activated, electrically powered, mechanically powered, a combination thereof, or the like. The pressure source 104 may have a pressure gauge and an isolation valve, which may be separate components. The pressure source 104 may be used for other testing purposes such a fuel injector nozzle tester. The pressure source 104 may provide hydraulic pressure in a range equal to a portion of the pressure range of the injection pressure regulator. The pressure source 104 may provide hydraulic pressure in a range equal to or greater than the pressure range of the injection pressure regulator. The pressure source 104 may provide hydraulic pressure in a range of about 0 through about 750 psi (5.2 MPa). The pressure source 104 may provide hydraulic pressure in a range of about 0 through about 6,000 psi (41.4 MPa).

The pressure source 104 is connected via the inlet tube 110 to the sleeve 102. The inlet tube 110 has connector 138 and connector 140. Connector 138 may be threaded and may screw into the second threaded portion 134 at the inlet passage 122 into the sleeve 102. Connector 140 may be threaded and may screw into a threaded portion of the pressure source 104. The tube 110 may have other connection mechanisms with the inlet passage 122 and the pressure source 104.

The drain tube 112 is connected to the sleeve 102. Drain tube 112 has a connecter 142, which may be threaded and which may screw into the third threaded portion 136 at the drain passage 126 of the sleeve 102. The drain tube 112 has an outlet end 144 disposed in the drain 106.

The power supply 108 has a wire 146 for connecting the power supply 108 to the injection pressure regulator. The power supply may be a battery pack, a transformer connected to house or other current, the battery in a vehicle, or the like. The wire 146 may be a two-wire electrical harness for tie-with the battery in a vehicle.

Figure 3:
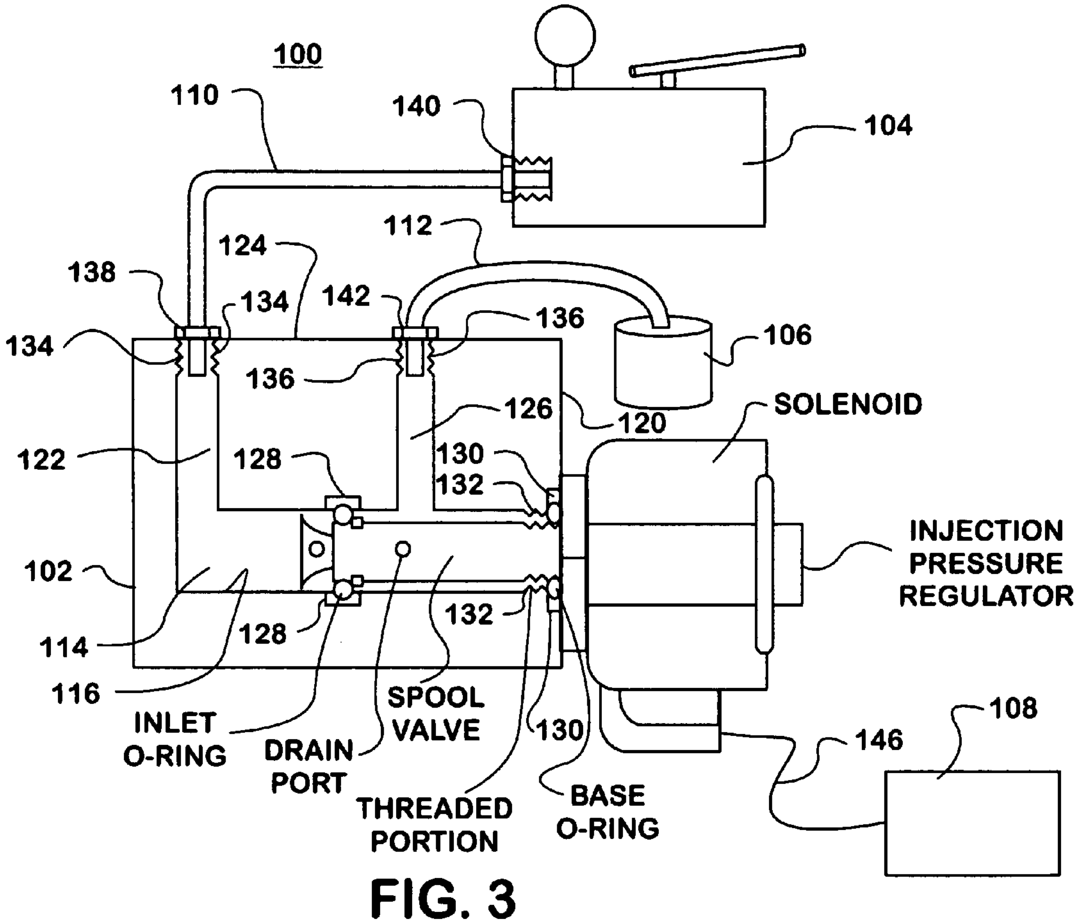
FIG. 3 is a schematic view of an injection pressure regulator test system with an injection pressure regulator.

FIG. 3 is a view of the injection pressure regulator (IPR) test system 100 with an injection pressure regulator inserted into the test chamber 114 of the sleeve 102. The threaded portion of the injection pressure regulator is screwed into the first threaded portion 132 on the inside surface 116 of the sleeve 120. The inlet O-ring of the injection pressure regulator sealably engages the middle interface 128 on the inside surface 116. The base O-ring of the injection pressure regulator sealably engages the end interface 130. The power supply 108 is connected to the injection pressure regulator via the wire 146.

During testing, the power supply 108 activates the injection pressure regulator to operate at a selected pressure level. The pressure source 104 pumps hydraulic fluid into the test chamber 114 to determine whether the injection pressure regulator can achieve a selected pressure level. Achieving the selected pressure level includes verifying whether the injection pressure regulator can hold the pressure within a selected tolerance of the selected pressure level for a selected time period. The pressure may be measured in relation to ambient pressure or a standard pressure such as atmospheric. The hydraulic fluid passes from the pressure source 104, through the inlet tube 110, through the inlet passage 122, and into the test chamber 114. The injection pressure regulator may pass hydraulic fluid through the spool valve, out the drain ports, and into the drain passage 126. The injection pressure regulator may pass hydraulic fluid out of the drain ports when the injection pressure regulator achieves the selected pressure level and at other pressure levels. The hydraulic fluid exits the sleeve 102 through the drain tube 112 and is collected in the drain 106. When the selected pressure level is achieved, the injection pressure regulator is deemed to be operating properly. When the selected pressure level is not achieved, the injection pressure regulator is deemed to be not operating properly.

The selected pressure level may be a pressure level for the high pressure oil in a HEUI fuel injection system on a diesel engine. The selected pressure level may be the pressure level for the high pressure oil under engine start conditions. The selected pressure level may be about 500 psi (3 MPa). The selected pressure level may be in the range of about 0 through about 4,500 psi (31 MPa). Other pressure levels may be used.

The selected tolerance may be in the range of about −1 percent through about +1 percent of the selected pressure level. The selected tolerance may have different tolerances above and below the selected pressure level. The selected tolerance may be in the range of about −1 percent through about +5 percent of the selected pressure level. Other tolerances may be use.

The selected time period may be about 3 seconds. The selected time period may be in the range of about 1 second through about 10 seconds. Other time periods may be used.

Figure 4:
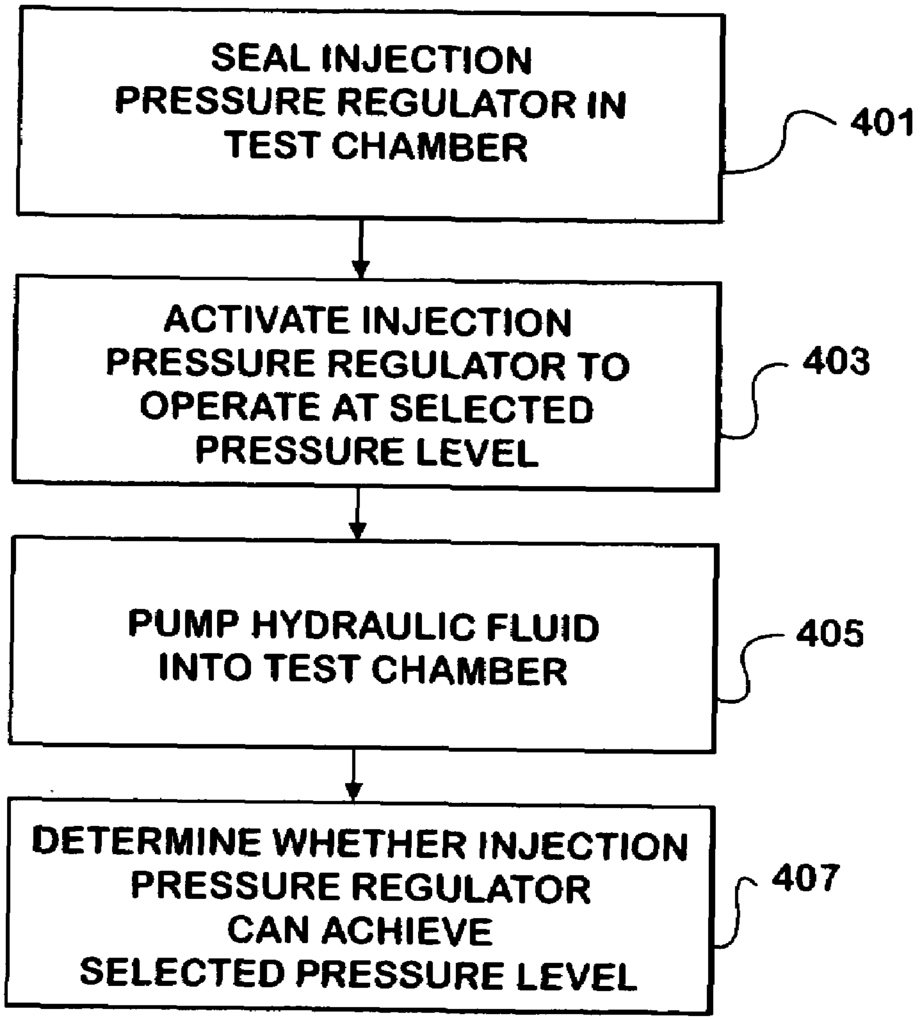
FIG. 4 is a flowchart of a method for testing an injection pressure regulator.

FIG. 4 is a flowchart of a method for testing an injection pressure regulator. The injection pressure regulator is inserted into a test chamber to determine whether the injection pressure regulator can achieve a selected pressure level as previously discussed. In block 401, the injection pressure regulator is sealed in the test chamber of a sleeve. The O-rings on the injection pressure regulator sealably engage interfaces on the sleeve when the injection pressure regulator is positioned in the test chamber. In block 403, the injection pressure regulator is activated for operation at a selected pressure level. In block 405, a pressure source pumps hydraulic fluid into the test chamber. In block 407, a determination is made whether the injection pressure regulator can achieve the selected pressure level. The determination includes verifying whether the injection pressure regulator can hold the pressure within a selected tolerance of the selected pressure level for a selected time period.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A method for testing an injection pressure regulator, comprising:

sealably engaging an injection pressure regulator in a test chamber formed by a rigid sleeve, wherein the step of sealably engaging includes:

sealably engaging a first O-ring of the injection pressure regulator against a first interface on an inside surface of the test chamber, and sealably engaging a second O-ring of the injection pressure regulator against a second interface on an inside surface of the test chamber:

activating the injection pressure regulator for operation at a selected pressure level;

pumping hydraulic fluid into the test chamber; and determining whether the injection pressure regulator can achieve the selected pressure level.

2. The method for testing an injection pressure regulator of claim 1, further comprising verifying whether the injection pressure regulator can hold the pressure within a selected tolerance of the selected pressure level for a selected time period.

3. The method for testing an injection pressure regulator of claim 2, where the selected pressure level is a pressure level far a HEUI fuel injection system.

4. The method for testing an injection pressure regulator of claim 1, where the selected pressure level is about 500 psi (3MPa);

where the selected tolerance is in the range of about −1 percent through about +1 percent of the selected pressure level; and where the selected time period Is in the range of about 1 second through about 10 seconds.

5. A method for testing an injection pressure regulator comprising:

placing the injection pressure regulator in a sleeve having a test chamber in fluid communication with the injection pressure regulator;

sealably engaging at least one O-ring disposed on the injection pressure regulator against at least one interface on an inside surface of the test chamber;

activating the injection pressure regulator for operation at a selected pressure level;

pumping hydraulic fluid into the test chamber;

venting hydraulic fluid out of the test chamber through the injection pressure regulator; and maintaining the selected pressure level In the test chamber.

6. The method of testing an injection pressure regulator of claim 5, wherein the at least one O-ring disposed on the injection pressure regulator includes a first O-ring engaging a first interface on the inside surface of the test chamber, and a second O-ring engaging a second interface on the inside surface of the test chamber.

7. A method for testing an injection pressure regulator comprising:

placing the injection pressure regulator in a sleeve having a test chamber in fluid communication with the injection pressure regulator;

sealably engaging a first O-ring of the injection pressure regulator against a first interface on an inside surface of the test chamber;

sealably engaging a second O-ring of the injection pressure regulator against a second interface on an inside surface of the test chamber;

activating the injection pressure regulator for operation at a selected pressure level;

pumping hydraulic fluid into the test chamber;

venting hydraulic fluid out of the test chamber through the injection pressure regulator; and maintaining the selected pressure level in the test chamber.

* * * * *